United States Patent
Brenzel et al.

(10) Patent No.: US 9,367,938 B2
(45) Date of Patent: Jun. 14, 2016

(54) METHOD AND APPARATUS FOR AUTOMATED REAL-TIME DETECTION OF OVERLAPPING PAINTED MARKUP ELEMENTS

(71) Applicant: Nokia Technologies Oy, Espoo (FI)

(72) Inventors: Aaron Brenzel, Oak Park, IL (US); Paul Sernatinger, Chicago, IL (US); James Werwath, Mount Prospect, IL (US)

(73) Assignee: Nokia Technologies Oy, Espoo (FI)

( * ) Notice: Subject to any disclaimer, the term of this patent is extended or adjusted under 35 U.S.C. 154(b) by 255 days.

(21) Appl. No.: 13/780,843

(22) Filed: Feb. 28, 2013

(65) Prior Publication Data

US 2014/0245127 A1    Aug. 28, 2014

(51) Int. Cl.
*G06F 17/22* (2006.01)
*G06T 11/60* (2006.01)

(52) U.S. Cl.
CPC ..................... *G06T 11/60* (2013.01)

(58) Field of Classification Search
CPC ............... G06F 17/30327; G06F 17/30333; G06F 17/2247
See application file for complete search history.

(56) References Cited

U.S. PATENT DOCUMENTS

| | | | | |
|---|---|---|---|---|
| 5,546,107 A * | 8/1996 | Deretsky | ............... | G09B 29/106 340/295 |
| 5,781,906 A * | 7/1998 | Aggarwal | ......... | G06F 17/30327 |
| 5,905,507 A * | 5/1999 | Rossignac | ................. | G06T 9/40 345/440 |
| 6,252,605 B1 * | 6/2001 | Beesley | ................. | G01C 21/32 345/441 |
| 6,757,686 B1 * | 6/2004 | Syeda-Mahmood | ........... | G06F 17/3028 |
| 7,805,463 B2 * | 9/2010 | Bevan | ............... | G06F 17/30241 707/803 |
| 7,877,405 B2 * | 1/2011 | Kothuri | ............. | G06F 17/30241 707/769 |
| 8,903,803 B1 * | 12/2014 | Aly | .................... | G06F 17/30333 707/713 |
| 9,053,191 B2 * | 6/2015 | Chandrasekhar | . | G06F 17/30867 |
| 2003/0187867 A1 * | 10/2003 | Smartt | ............. | G06F 17/30241 |
| 2004/0193566 A1 * | 9/2004 | Kothuri | ............. | G06F 17/30241 |
| 2006/0150092 A1 | 7/2006 | Atkins | | |
| 2007/0073777 A1 | 3/2007 | Werwath et al. | | |
| 2007/0198568 A1 * | 8/2007 | Luo | .................... | G06F 17/30333 |
| 2012/0197856 A1 * | 8/2012 | Banka | ................. | H04L 67/2885 707/706 |
| 2012/0320073 A1 * | 12/2012 | Mason | .................. | G06F 3/1431 345/581 |

OTHER PUBLICATIONS

R-Tree Demo—Splitting Methods, pp. 1-2 http://donar.umiacs.umd.edu/quadtree/docs/rtree_split_rules.html.*
Kamel et al. "On Packing R-trees", Proceedings of the Second International Conference on Information and Knowledge Management, ACM (Nov. 1993) pp. 1-10.*
International Search Report and Written Opinion for Application No. PCT/FI2014/050054 dated Apr. 17, 2014.
Kamel, I. et al., *On Packing R-trees*, Proceedings of the Second International Conference on Information and Knowledge Management, ACM (Nov. 1993) 490-499.
Oracle Spatial Developer's Guide 11g Release 1 (11.1) [online]. Oracle, 2012 [retrieved on Apr. 1, 2014] [archived on Jun. 5, 2012]. Retrieved from the Internet: <URL: https://web.archive.org/web/20120606036413/http://docs.oracle.com/cdB28359_01/appdev.111/b28400/sdo_intro.htm>. (dated Jun. 2012) 18 pages.

(Continued)

*Primary Examiner* — Scott Baderman
*Assistant Examiner* — Mario M Velez-Lopez
(74) *Attorney, Agent, or Firm* — Alston & Bird LLP (57) ABSTRACT

Various methods are provided for automated real-time detection of overlapping painted html elements.

21 Claims, 5 Drawing Sheets

(56) References Cited

OTHER PUBLICATIONS

Kamel, I. et al., *Hilbert R-tree: An Improved R-tree Using Fractals*, Proceedings of the 20$^{th}$ VLDB Conference; Santiago, Chile (1994) pp. 500-509.

*Detecting Whether Two Boxes Overlap* [online][retrieved May 7, 2013] Retrieved from the Internet: <URL: http://gamemath.com/2011/09/detecting-whether-two-boxes-overlap > 3 pages.

*Midpoint Circle Algorithm*, [online][retrieved May 7, 2013] Retrieved from the Internet: <URL: http://en.wikipedia.org/wiki/Midpoint_circle_algorithm > 7 pages.

*Rotating Calipers*, [online][retrieved May 7, 2013] Retrieved from the Internet: <URL: http://en.wikipedia.org/wiki/Rotating_calipers > 3 pages.

\* cited by examiner

METHOD AND APPARATUS FOR AUTOMATED REAL-TIME DETECTION OF OVERLAPPING PAINTED MARKUP ELEMENTS

TECHNOLOGICAL FIELD

Embodiments of the present invention relate generally to a method, apparatus, and computer program product for automated real-time detection of overlapping painted html elements.

BACKGROUND

Advances in technology have made it possible to do most anything on a mobile phone that can be done on a personal computer. However, since many applications are made for a personal computer, additional processing mechanisms may be necessary to provide the same experience on a mobile phone. Conserving processing power is naturally a concern given the extra tasks and the fact that mobile phones are running on batteries. One way to conserve processing power is to employ a proxy browser. A proxy browser, which may be a server, a computer system or application that acts as an intermediary for requests from clients, such as a mobile phone, seeking resources from other servers. The client connects to the proxy browser and requests a service, such as a file, a connection, a web page, or other resource available from a different server. The proxy browser may then evaluate the request to determine a method to simplify its complexity.

The present invention relates to a proxy browser that is in essence a server that sits between a client browser and the world wide web and takes care of most of the information processing (graphics, layout, JavaScript, and so on) a client browser would do before sending along the information to the client. This is done to conserve processing power on low-end devices as well as for data compression.

The invention specifically relates to one area of the proxy server's function: the laying out of graphical elements specified by a webpage's Hypertext Markup Language (HTML) markup. For example, if the webpage requested by the client contains a table of information, the proxy server will convert that table into a series of lines and text items that will be sent to the client with pre-calculated coordinates for all the associated graphics. The client will then take those coordinates and draw them verbatim to the device screen.

Layout engines in the browser sometimes generate overlapping text, images, and other graphics, especially in a proxy browsing situation, where HTML is converted to primitive paint commands on a server rather than the client device. Because the proxy browsing engine on the server must service thousands of requests per second, brute force detection and correction of overlapping elements (an $O(N^2)$ best-case algorithm) is unrealistic. The overlap results in a poor user experience, and may even make some user interactions impossible.

In the prior art, the problem of "given a set of rectangles, find all overlapping pairs" can be solved, but only by a brute force search (i.e., for each rectangle in the set, check every other rectangle for overlap), which runs in $O(N^2)$ time. A higher level problem of "given a set of arbitrary polygons, find all overlapping pairs" is more time consuming still, because the $O(N^2)$ brute force algorithm is further complicated by needing to use the "rotating calipers" method on each polygon in the set to detect intersection, which runs in time linear to the number of vertices in the polygon. In sum, current methods are too inefficient for real-time use.

BRIEF SUMMARY

A method, apparatus and computer program product are therefore provided according to an example embodiment of the present invention for the automated real-time detection of overlapping painted html elements.

The present invention is to use spatial trees, more specifically, a Hilbert-curve packed R-Tree, and polygon "vertex slicing" to reduce the search time needed to identify potential overlapping elements. The present invention may reduce search time to $O(\lg_x n)$, where x is the "leaf size" of the tree.

The main advantage of this solution is its efficiency relative to the algorithms of the prior art. A brute force check for overlapping elements is a best-case $N^2$ operation, where N is number of elements painted to the screen. Depending on the shape being checked, the standard operation for detecting overlap could also add another factor linear to the number of vertices in the polygon to each check. This is an unacceptable detriment to performance on a real-time, highly available application like a proxy server.

One example method may include loading a spatial tree with one or more elements specified by a web source, wherein loading includes determining node placement in accordance with a Hilbert Curve and assigning each of one or more elements to a node in the spatial tree, and determining an overlap of elements by searching the spatial tree using a plurality of points, the plurality of points representing specified points of the one or more elements, wherein, when the search returns more than one element, an overlap is determined to exist. The spatial tree may be a packed Hilbert R-Tree. The one or more elements may be specified by a markup language of a webpage. The method may further comprise configuring a default search mode as an exhaustive search. The method may further comprise configuring the packed Hilbert R-Tree to accept point queries. The specified points of each of the one or more elements may be dependent on a shape of the element. The method may further comprise determining the specified points of the one or more elements, wherein, in an instance when an element is a rectangle, the specified points are the vertices of the rectangle, wherein in an instance when the element is a line, the specified points are resulting endpoints obtained by dividing the line into a plurality of segments, and wherein in an instance when the element is a circle, the specified points are obtained utilizing a center point and a radius of the circle.

An example apparatus may include at least one processor and at least one memory storing computer program code, wherein the at least one memory and stored computer program code are configured, with the at least one processor, to cause the apparatus to load a spatial tree with one or more elements specified by a web source, wherein loading includes determining node placement in accordance with a Hilbert Curve and assigning each of one or more elements to a node in the spatial tree, and determine an overlap of elements by searching the spatial tree using a plurality of points, the plurality of points representing specified points of the one or more elements, wherein, when the search returns more than one element, an overlap is determined to exist. The spatial tree may be a packed Hilbert R-Tree. The one or more elements may be specified by a markup language of a webpage.

The at least one memory and stored computer program code are further configured, with the at least one processor, to cause the apparatus to configure a default search mode as an exhaustive search. The method may further comprise configuring the packed Hilbert R-Tree to accept point queries. The specified points of each of the one or more elements may be dependent on a shape of the element. The at least one memory and stored computer program code are further configured, with the at least one processor, to cause the apparatus to determine the specified points of the one or more elements, wherein, in an instance when an element is a rectangle, the specified points are the vertices of the rectangle, wherein in an instance when the element is a line, the specified points are resulting endpoints obtained by dividing the line into a plurality of segments, and wherein in an instance when the element is a circle, the specified points are obtained utilizing a center point and a radius of the circle.

In a further embodiment, a computer program product is provided that includes at least one non-transitory computer-readable storage medium having computer-readable program instructions stored therein, the computer-readable program instructions includes program instructions configured for loading a spatial tree with one or more elements specified by a web source, wherein loading includes determining node placement in accordance with a Hilbert Curve and assigning each of one or more elements to a node in the spatial tree, and determining an overlap of elements by searching the spatial tree using a plurality of points, the plurality of points representing specified points of the one or more elements, wherein, when the search returns more than one element, an overlap is determined to exist. The spatial tree may be a packed Hilbert R-Tree. The one or more elements may be specified by a markup language of a webpage.

The computer-readable program instructions also include program instructions configured for configuring a default search mode as an exhaustive search. The method may further comprise configuring the packed Hilbert R-Tree to accept point queries. The specified points of each of the one or more elements may be dependent on a shape of the element The computer-readable program instructions also include program instructions configured for determining the specified points of the one or more elements, wherein, in an instance when an element is a rectangle, the specified points are the vertices of the rectangle, wherein in an instance when the element is a line, the specified points are resulting endpoints obtained by dividing the line into a plurality of segments, and wherein in an instance when the element is a circle, the specified points are obtained utilizing a center point and a radius of the circle.

One example apparatus may include means for loading a spatial tree with one or more elements specified by a web source, wherein loading includes determining node placement in accordance with a Hilbert Curve and assigning each of one or more elements to a node in the spatial tree, and means for determining an overlap of elements by searching the spatial tree using a plurality of points, the plurality of points representing specified points of the one or more elements, wherein, when the search returns more than one element, an overlap is determined to exist. The spatial tree may be a packed Hilbert R-Tree. The one or more elements may be specified by a markup language of a webpage. The apparatus may further include means for configuring a default search mode as an exhaustive search. The apparatus may further include means for configuring the packed Hilbert R-Tree to accept point queries. The specified points of each of the one or more elements may be dependent on a shape of the element. The apparatus may further include means for determining the specified points of the one or more elements, wherein, in an instance when an element is a rectangle, the specified points are the vertices of the rectangle, wherein in an instance when the element is a line, the specified points are resulting endpoints obtained by dividing the line into a plurality of segments, and wherein in an instance when the element is a circle, the specified points are obtained utilizing a center point and a radius of the circle.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or application specific integrated circuit for a mobile phone or a similar integrated circuit in a server, a cellular network device, or other network device.

Figure 1:
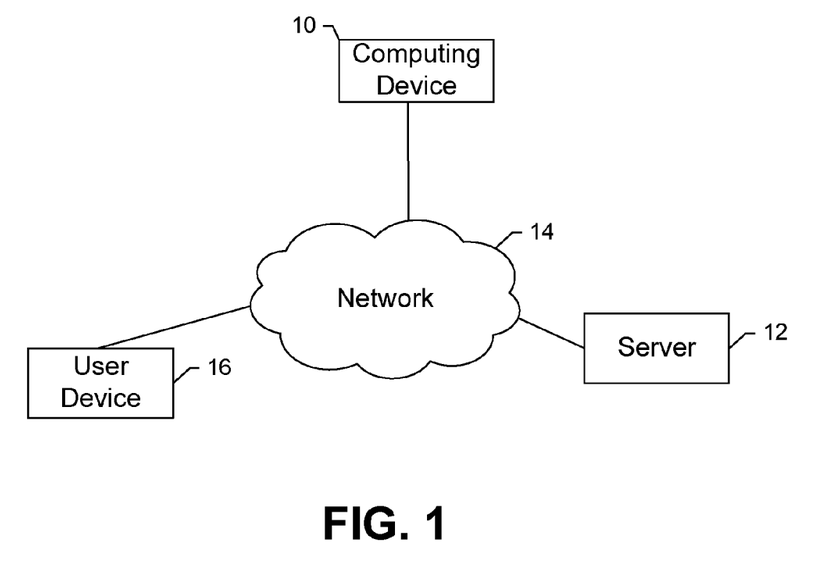
FIG. 1 is block diagram of a system that may be specifically configured in accordance with an example embodiment of the present invention.

Referring now of FIG. 1, a system that supports communication, either wirelessly or via a wireline, between a computing device 10 and a server 12 or other network entity (hereinafter generically referenced as a "server") is illustrated. As shown, the computing device and the server may be in communication via a network 14, such as a wide area network, such as a cellular network or the Internet or a local area network. However, the computing device and the server may be in communication in other manners, such as via direct communications between the computing device and the server.

The computing device 10 may be embodied by a number of different devices including mobile computing devices, such as a personal digital assistant (PDA), mobile telephone, smartphone, laptop computer, tablet computer, or any combination of the aforementioned, and other types of voice and text communications systems. Alternatively, the computing device may be a fixed computing device, such as a personal computer, a computer workstation or the like. The server 12 may also be embodied by a computing device and, in one embodiment, is embodied by a web server. Additionally, while the system of FIG. 1 depicts a single server, the server may be comprised of a plurality of servers which may collaborate to support browsing activity conducted by the computing device.

Figure 2:
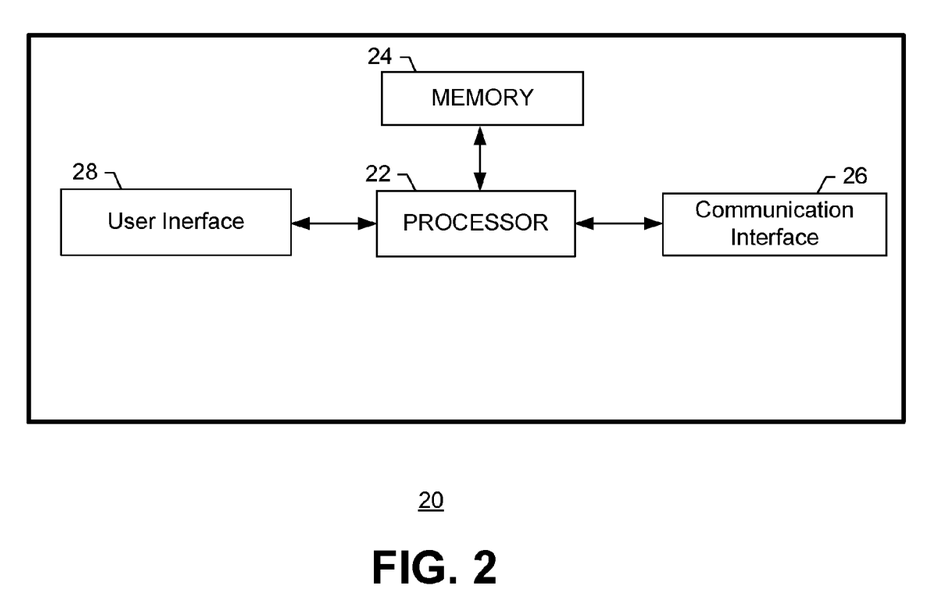
FIG. 2 is a block diagram of an apparatus that may be specifically configured in accordance with an example embodiment of the present invention.

Regardless of the type of device that embodies the computing device 10, the computing device may include or be associated with an apparatus 20 as shown in FIG. 2. In this regard, the apparatus may include or otherwise be in communication with a processor 22, a memory device 24, a communication interface 26 and a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device 10 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 26 may be any means such as a device or circuitry embodied in either hardware or a combination of hardware and software that is configured to receive and/or transmit data between the computing device 10 and a server 12. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 28 may be in communication with the processor 22, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 24 and/or the communication interface 26, such as via a bus.

Figure 3:
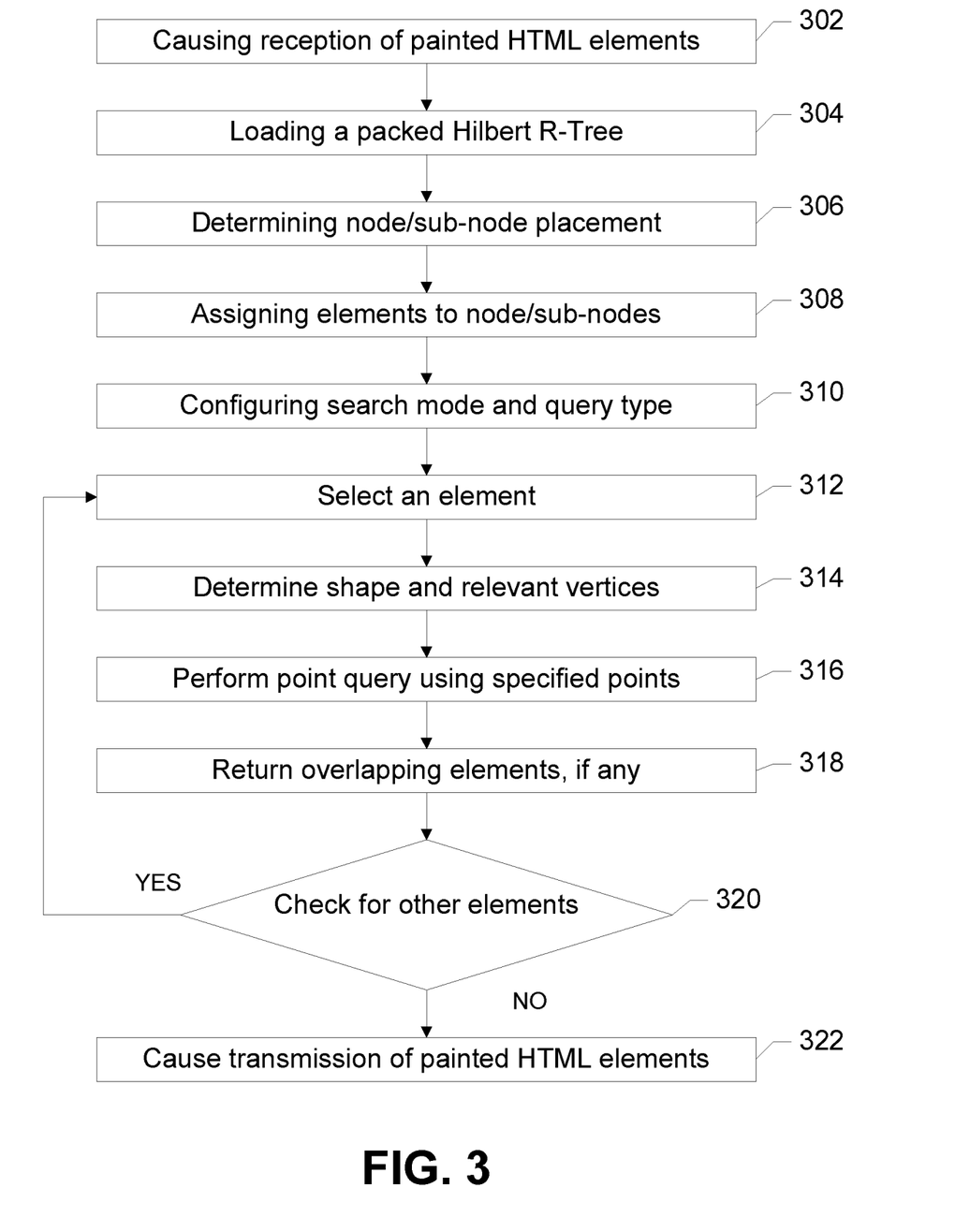
FIG. 3 is an example flowchart illustrating a method of operating an example apparatus in accordance with an embodiment of the present invention.
Figure 6:
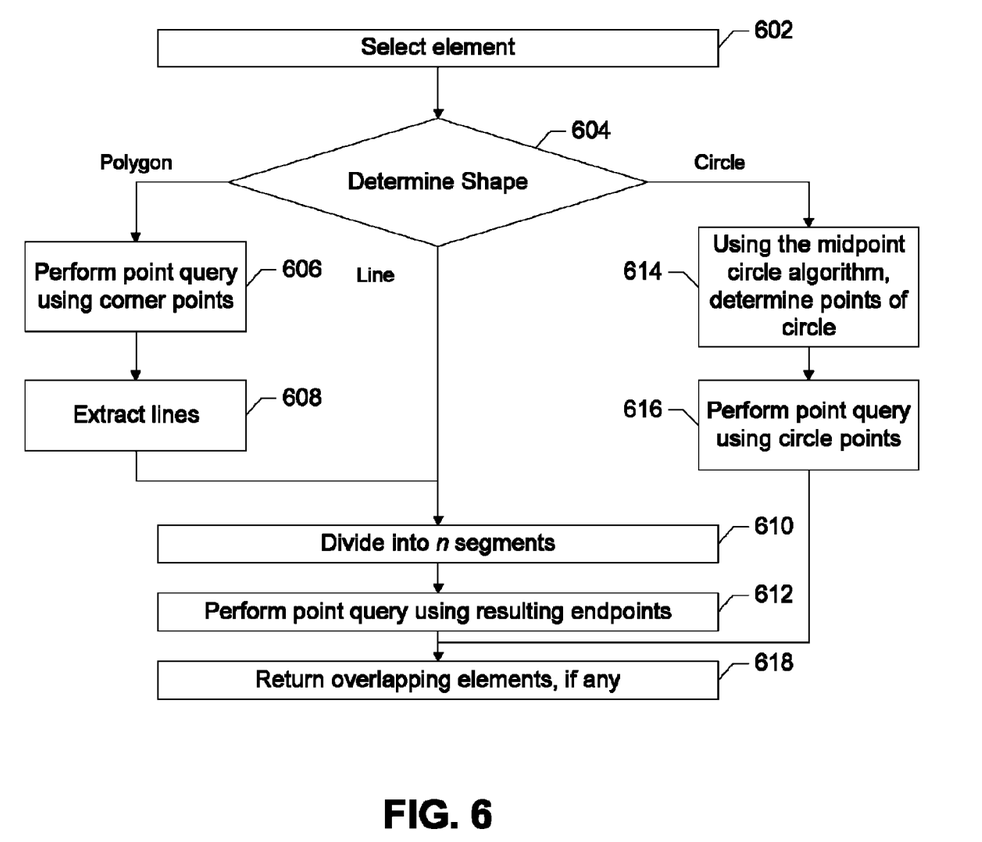
FIG. 6 is an example flowchart illustrating a method of operating an example apparatus in accordance with an embodiment of the present invention

FIGS. 3 and 6 illustrate an example flowchart of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 3 and 6, when executed, convert a computer or processing circuitry into a particular machine configured to perform an example embodiment of the present invention. Accordingly, the operations of FIGS. 3 and 6 define an algorithm for configuring a computer or processing to perform an example embodiment. In some cases, a general purpose computer may be provided with an instance of the processor which performs the algorithms of FIGS. 3 and 6 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

FIG. 3 is an example flowchart illustrating a method of operating an example content processing system performed in accordance with an embodiment of the present invention. As shown in block 302 of FIG. 3, the apparatus 20 embodied by the computing device 10 may therefore be configured to cause reception of markup elements from a web source. The apparatus embodied by the computing device therefore includes means, such as the processor 22, the communication interface 26 or the like, for causing reception of markup elements from a web source. Markup elements may be written or described in HTML, XML or the like. The markup elements may be received from a web page over a network, the World Wide Web (WWW) or the like.

As shown in block 304 of FIG. 3, the apparatus 20 embodied by the computing device 10 may be configured to load a packed Hilbert R-Tree. The apparatus embodied by the computing device therefore includes means, such as the processor 22, the communication interface 26 or the like, for loading a packed Hilbert R-tree.

An R-Tree is a data structure in which each node in the tree contains a pre-defined number of objects with branches to other nodes that can be followed programmatically during a search. R-Trees are typically used in database applications to answer questions like "given a point (x,y), find if that point is contained within a given metropolitan area."

Figure 4:
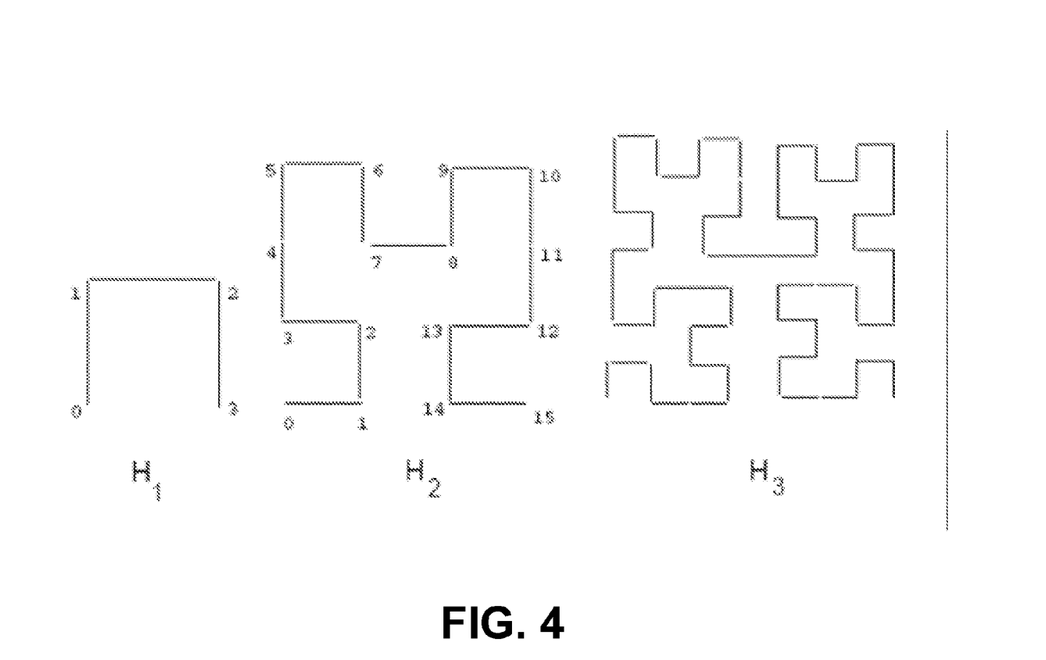
FIG. 4 is an example diagram showing shows Hilbert Curves of order 1, 2, and 3 in accordance with an embodiment of the present invention.

An example algorithm for loading elements into an R-tree is to first calculate the Hilbert value for each element. FIG. 4 shows Hilbert Curves of order 1, 2, and 3. Next, sort the elements on ascending Hilbert values. Once the elements are sorted, leaf nodes are then created. Once leaf nodes are created, higher level nodes are created. Leaf node creation may comprise determining more elements are to be sorted and generating new leaf nodes, and then assigning a predetermined number of elements to the new leaf node. Higher level node creation may comprise determining if there are more than 1 sub-node, sorting the sub-nodes by creation time, and generating a new node, and assigning a predetermined number of sub-nodes to the new node. A splitting policy of the R-Tree may be specified in advance or may be calculated as a function of the number of received elements.

As shown in block 306 of FIG. 3, the apparatus 20 embodied by the computing device 10 may be configured to determine node placement. The apparatus embodied by the computing device therefore includes means, such as the processor 22, the communication interface 26 or the like, for determining node placement. In one embodiment, node and sub-node placement may be determined in an instance where sub-nodes are present and/or needed. The elements in the nodes and the branches between them are determined, in the case of an R-Tree, by an algorithm that minimizes the overall "minimum bounding rectangle" (MBR) needed to contain all the elements in a given node and all its sub nodes. The efficiency of an R-Tree is determined by its "packing factor," which is to say, how efficiently it apportions elements into the nodes and the overall ratio of placed elements to maximum node size (e.g., if a node has been pre-defined to hold 5 elements, then as many nodes as possible should be filled with 5 elements).

Figure 5:
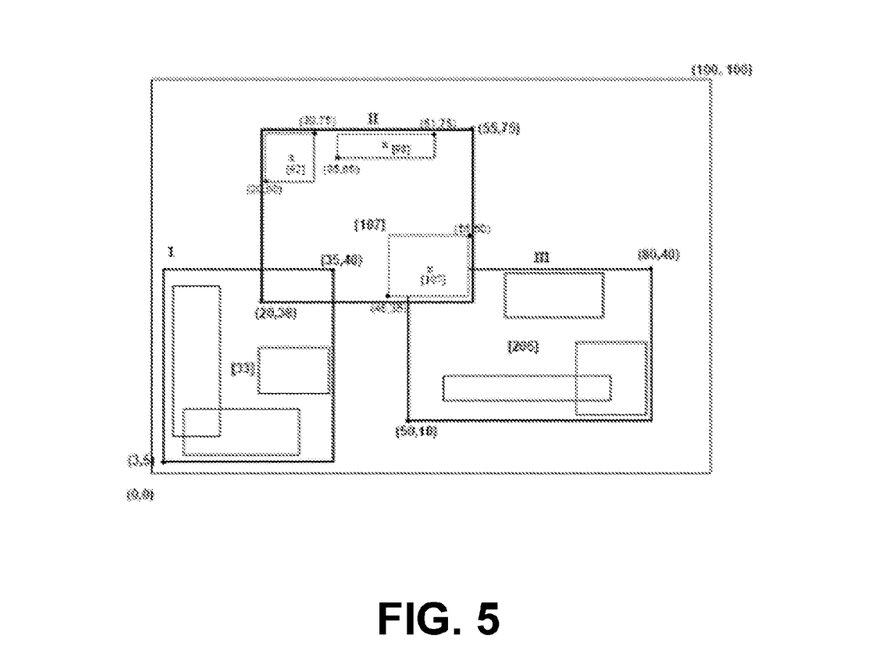
FIG. 5 is an example showing rectangles packed according to an order 2 Hilbert Curve according to an embodiment of the present invention.

As shown in block 308 of FIG. 3, the apparatus 20 embodied by the computing device 10 may be configured to assign elements to the nodes and/or sub-nodes in accordance with the Hilbert curve. The apparatus embodied by the computing device therefore includes means, such as the processor 22, the communication interface 26 or the like, for assigning elements to the nodes and/or sub-nodes in accordance with the Hilbert curve. In one embodiment, other space filling curves may be used. FIG. 5 shows an example of rectangles packed according to an order 2 Hilbert Curve. The Hilbert curve imposes a linear ordering on the data rectangles and then traverses the sorted list, assigning each set of the elements to a node in the R-tree. The final result may be that the set of elements on the same node will be close to each other in the linear ordering, and in the native space. By grouping the points according to their Hilbert values, the MBRs of the resulting R-tree nodes tend to be small square-like rectangles. This indicates that the nodes will likely have small area and small perimeters. Small area values result in good performance for point queries.

As shown in block 310 of FIG. 3, the apparatus 20 embodied by the computing device 10 may be configured to configure the spatial tree. The apparatus embodied by the computing device therefore includes means, such as the processor 22, the communication interface 26 or the like, for configuring the spatial tree. In one embodiment according to the present invention, the Hilbert packed R-Tree is configured for an exhaustive search as a default search mode. Additionally or alternatively, the R-Tree may be configured for point queries. In one embodiment, rectangle queries may be utilized and/or fuzzy searches may be handled.

As shown in block 312 of FIG. 3, the apparatus 20 embodied by the computing device 10 may be configured to select an element. The apparatus embodied by the computing device therefore includes means, such as the processor 22, the communication interface 26 or the like, for selecting an element.

As shown in block 314 of FIG. 3, the apparatus 20 embodied by the computing device 10 may be configured to determine the shape of the element. The apparatus embodied by the computing device therefore includes means, such as the processor 22, the communication interface 26 or the like, for determining the shape of the element. Using the shape of the element, the relevant vertices are determined and/or calculated. FIG. 6 further expands on determining the shape of and element and calculating the relevant vertices in accordance with the shape.

As shown in block 316 of FIG. 3, the apparatus 20 embodied by the computing device 10 may be configured to perform a point query using a relevant vertex. The apparatus embodied by the computing device therefore includes means, such as the processor 22, the communication interface 26 or the like, for performing a point query using a relevant vertex. In one embodiment, where more than one relevant vertex is calculated, determined or otherwise considered, point query searches for each of one or more of the relevant vertices are performed.

As shown in block 318 of FIG. 3, the apparatus 20 embodied by the computing device 10 may be configured to return overlapping elements. The apparatus embodied by the computing device therefore includes means, such as the processor 22, the communication interface 26 or the like, for returning overlapping elements. For example, when a corner of a rectangle is determined to be a relevant vertex, and a point query is performed using the corner, each element that the corner is round in, is returned. In an instance where the point is found in two elements, both elements are returned and an overlap is determined to exist. In another example embodiment, when a corner of a rectangle is determined to be a relevant vertex, and a point query is performed using the corner, each element that the corner is round in, is returned. In an instance where the point is found in only one element, the one element may be returned and an overlap is not determined to exist. Additional points may then be used to determine whether an overlap exists.

As shown in block 320 of FIG. 3, the apparatus 20 embodied by the computing device 10 may be configured to check for additional elements. The apparatus embodied by the computing device therefore includes means, such as the processor 22, the communication interface 26 or the like, for checking for additional elements. When the check determines that one or more additional elements are present and/or need to be analyzed, the process returns to step 312 and selects another element.

Where no other elements are determined to present and/or needed to be analyzed, the process proceeds to step 322. As shown in block 322 of FIG. 3, the apparatus 20 embodied by the computing device 10 may be configured to provide an output. The apparatus embodied by the computing device therefore includes means, such as the processor 22, the communication interface 26 or the like, for providing an output. The output may be to provide the elements to a web browser. The output may be to provide to an overlap corrections process. The output may be to provide information regarding overlapping elements to a determination process for determining whether to provide the elements to the web browser or to an overlap correction process.

FIG. 6 is an example flowchart illustrating an example method of operating a content processing system performed in accordance with an embodiment of the present invention. As shown in block 602 of FIG. 6, the apparatus 20 embodied by the computing device 10 may therefore be configured to cause selection of an element. The apparatus embodied by the computing device therefore includes means, such as the processor 22, the communication interface 26 or the like, for causing selection of an element.

As shown in block 604 of FIG. 6, the apparatus 20 embodied by the computing device 10 may be configured to determine the shape of the selected element. The apparatus embodied by the computing device therefore includes means, such as the processor 22, the communication interface 26 or the like, for determining the shape of the selected element.

In an embodiment in which step 604 determines the selected element is a polygon, the process may proceed to step 606. As shown in block 606 of FIG. 6, the apparatus 20 embodied by the computing device 10 may be configured to perform a point query using one or more corner points of the polygon. The apparatus embodied by the computing device therefore includes means, such as the processor 22, the communication interface 26 or the like, for performing a point query using one or more corner points of the polygon. The performing of a point query using the corner points of a polygon may be repeated one or more times, such that two or more corner points are utilized.

As shown in block 608 of FIG. 6, the apparatus 20 embodied by the computing device 10 may be configured to extract the lines of the polygon. The apparatus embodied by the computing device therefore includes means, such as the processor 22, the communication interface 26 or the like, for extracting the lines of the polygon.

In an embodiment in which the determination step 604 determines the element to be a line or in an embodiment where one or more lines of a polygon are used, the process proceeds to step 610. As shown in block 610 of FIG. 6, the apparatus 20 embodied by the computing device 10 may be configured to divide the line into n segments. The apparatus embodied by the computing device therefore includes means, such as the processor 22, the communication interface 26 or the like, for dividing the line into n segments. The number of segments, n, may be predetermined, may be dependent on the length of the line, or the like.

As shown in block 612 of FIG. 6, the apparatus 20 embodied by the computing device 10 may be configured to perform a point query using a resulting endpoint. The apparatus embodied by the computing device therefore includes means, such as the processor 22, the communication interface 26 or the like, for performing a point query using a resulting endpoint. Performing a point query using an endpoint of a resulting endpoint may be repeated one or more times, such that each of two more endpoints is utilized.

In an embodiment in which the determination step 604 determines an element to be a circle, ellipse, or the like, the process proceeds to step 614. As shown in block 614 of FIG. 6, the apparatus 20 embodied by the computing device 10 may be configured to use the midpoint circle algorithm, or a generalized equivalent, to determine one or more points of the circle or the like. The apparatus embodied by the computing device therefore includes means, such as the processor 22, the communication interface 26 or the like, for using the midpoint circle algorithm or a generalized equivalent, to determine one or more points of the circle or the like. The midpoint circle algorithm is known in the art, as well are a number of related methods for determining specific points of a circle, ellipse, parabola or the like.

As shown in block 616 of FIG. 6, the apparatus 20 embodied by the computing device 10 may be configured to perform a point query using a point of the circle. The apparatus embodied by the computing device therefore includes means, such as the processor 22, the communication interface 26 or the like, for performing a point query using a point of the circle. The performing of a point query may be repeated one or more times such that two or more points of the circle are utilized.

As shown in block 618 of FIG. 6, the apparatus 20 embodied by the computing device 10 may be configured to return overlapping elements. The apparatus embodied by the computing device therefore includes means, such as the processor 22, the communication interface 26 or the like, for returning overlapping elements. In one embodiment, where a point query is performed using a point from a selected shape, and no overlap is found, only the original element is returned and no overlapping is found. The process may be repeated for one or more additional points from the selected shape to further search for overlapping points. For example, lines may be divided any number of times and searches may be performed using the resulting endpoints. The more endpoints searched, the higher the accuracy of the determination of overlap.

Figure 7:
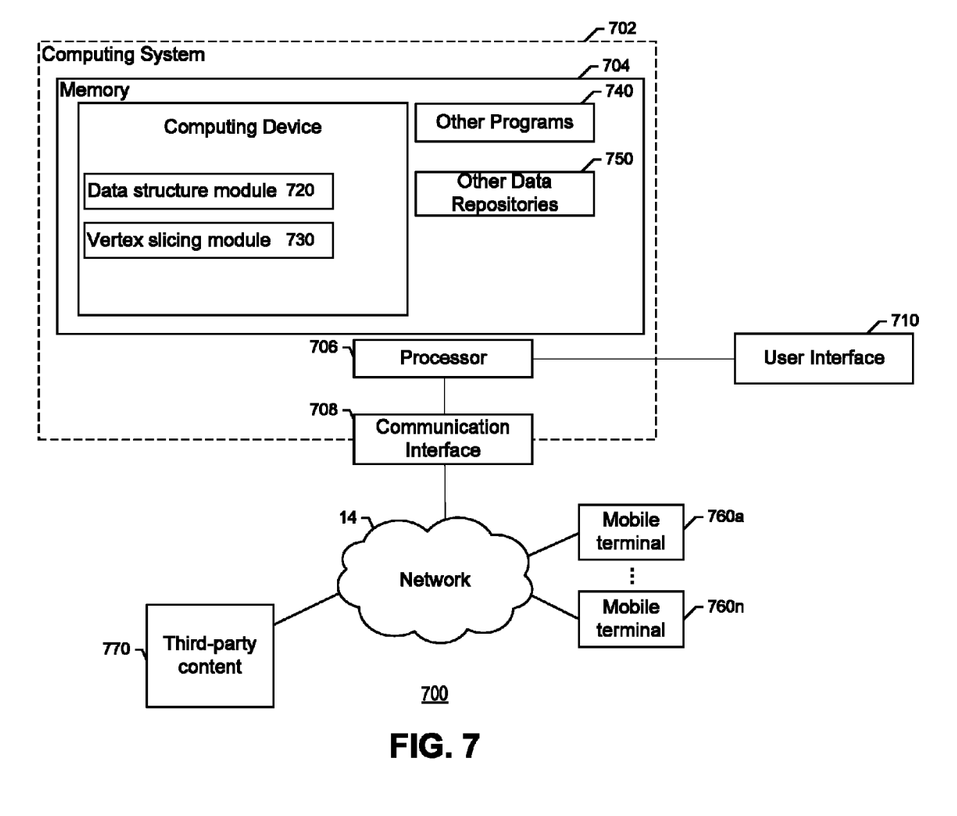
FIG. 7 is an example block diagram of an example computing device for practicing embodiments of a content processing system.

FIG. 7 is an example block diagram of an example computing device for practicing embodiments of content processing system. In particular, FIG. 7 shows a system 20 that may be utilized to implement a content processing system 710. Note that one or more general purpose or special purpose computing systems/devices may be used to implement the content processing system 710. In addition, the system may comprise one or more distinct computing systems/devices and may span distributed locations. Furthermore, each block shown may represent one or more such blocks as appropriate to a specific embodiment or may be combined with other blocks. For example, in some embodiments the system may contain a data structure module 720 and a vertex slicing module 730 or any combination of the three. In other example embodiments, the data structure module 720 and the vertex slicing module 730 may be configured to operate on separate systems (e.g. a mobile terminal and a remote server, multiple remote servers and/or the like). For example, the data structure module 720 and/or the vertex slicing module 730 may be configured to operate on a mobile terminal 10. Also, the content processing system 710 may be implemented in software, hardware, firmware, or in some combination to achieve the capabilities described herein.

While the system may be employed, for example, by a mobile terminal 10, stand-alone system (e.g. remote server), it should be noted that the components, devices or elements described below may not be mandatory and thus some may be omitted in certain embodiments. Additionally, some embodiments may include further or different components, devices or elements beyond those shown and described herein.

In the embodiment shown, system 20 comprises a computer memory ("memory") 704, one or more processors 706 (e.g. processing circuitry) and a communications interface 710. The content processing system 710 is shown residing in memory 704. In other embodiments, some portion of the contents, some or all of the components of the content processing system 710 may be stored on and/or transmitted over other computer-readable media. The components of the content processing system 710 preferably execute on one or more processors 706 and are configured to create and load a tree data structure and calculate and/or determine relevant points for search the tree data structure. Other code or programs 740 (e.g., an administrative interface, a Web server, and the like) and potentially other data repositories, such as data repository 750, also reside in the memory 704, and preferably execute on processor 706. Of note, one or more of the components in FIG. 7 may not be present in any specific implementation.

In a typical embodiment, as described above, the content processing system 710 may include a data structure module 720, a vertex slicing module 730 and/or both. The data structure module 720 and a vertex slicing module 730 may perform functions such as those outlined in FIG. 1. The content processing system 710 interacts via the network 14 via a communications interface 26 with (1) mobile terminals 760 and/or (2) with third-party content 770. The network 14 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. In this regard, the communications interface 26 may be capable of operating with one or more air interface standards, communication protocols, modulation types, access types, and/or the like. More particularly, the system the communications interface 708 or the like may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

In an example embodiment, components/modules of the content processing system 710 may be implemented using standard programming techniques. For example, the content processing system 710 may be implemented as a "native" executable running on the processor 706, along with one or more static or dynamic libraries. In other embodiments, the content processing system 710 may be implemented as instructions processed by a virtual machine that executes as one of the other programs 740. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the content processing system 710, can be made available by standard mechanisms such as through C, C++, C#, and Java APIs; libraries for accessing files, databases, or other data repositories; through languages such as XML; or through Web servers, FTP servers, or other types of servers providing access to stored data. A data store may also be included and it may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the content processing system 710 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    loading a spatial tree with one or more elements specified by a web source,
    wherein loading includes determining node placement in accordance with a Hilbert Curve and assigning each of one or more elements to a node in the spatial tree; and
    identifying an overlap of elements by searching the spatial tree using a plurality of points, the plurality of points representing specified points of the one or more elements, wherein, when the search returns more than one element, an overlap is determined to exist.

2. The method of claim 1, wherein the spatial tree is a packed Hilbert R-Tree.

3. The method of claim 1, wherein the one or more elements are specified by a markup language of a webpage.

4. The method of claim 1 further comprising configuring a default search mode as an exhaustive search.

5. The method of claim 1 further comprising configuring the spatial tree to accept point queries.

6. The method of claim 1, wherein the specified points of each of the one or more elements is dependent on a shape of the element.

7. The method of claim 6, further comprising determining the specified points of the one or more elements, wherein, in an instance when an element is a rectangle, the specified points are the vertices of the rectangle, wherein in an instance when the element is a line, the specified points are resulting endpoints obtained by dividing the line into a plurality of segments, and wherein in an instance when the element is a circle, the specified points are obtained utilizing a center point and a radius of the circle.

8. An apparatus comprising at least one processor and at least one memory including computer program code, the at least one memory and the computer program code configured to, with the processor, cause the apparatus to at least:
    load a spatial tree with one or more elements specified by a web source,
    wherein loading includes determining node placement in accordance with a Hilbert Curve and assigning each of one or more elements to a node in the spatial tree; and
    identify an overlap of elements by searching the spatial tree using a plurality of points, the plurality of points representing specified points of the one or more elements, wherein, when the search returns more than one element, an overlap is determined to exist.

9. An apparatus according to claim 8, wherein the spatial tree is a packed Hilbert R-Tree.

10. An apparatus according to claim 8, wherein the one or more elements are specified by a markup language of a webpage.

11. An apparatus according to claim 8, wherein the at least one memory and the computer program code are further configured to, with the processor, cause the apparatus to configure a default search mode as an exhaustive search.

12. An apparatus according to claim 8, wherein the at least one memory and the computer program code are further configured to, with the processor, cause the apparatus to configure the packed Hilbert R-Tree to accept point queries.

13. An apparatus according to claim 8, wherein the specified points of each of the one or more elements is dependent on a shape of the element.

14. An apparatus according to claim 13, wherein the at least one memory and the computer program code are further configured to, with the processor, cause the apparatus to:
    determine the specified points of the one or more elements, wherein, in an instance when an element is a rectangle, the specified points are the vertices of the rectangle, wherein in an instance when the element is a line, the specified points are resulting endpoints obtained by dividing the line into a plurality of segments, and wherein in an instance when the element is a circle, the specified points are obtained utilizing a center point and a radius of the circle.

15. A computer program product comprising at least one non-transitory computer-readable storage medium having computer-executable program code portions stored therein, the computer-executable program code portions comprising program code instructions for:
    loading a spatial tree with one or more elements specified by a web source,
    wherein loading includes determining node placement in accordance with a Hilbert Curve and assigning each of one or more elements to a node in the spatial tree; and
    identifying an overlap of elements by searching the spatial tree using a plurality of points, the plurality of points representing specified points of the one or more elements, wherein, when the search returns more than one element, an overlap is determined to exist.

16. A computer program product according to claim 15, wherein the spatial tree is a packed Hilbert R-Tree.

17. A computer program product according to claim 15, wherein the one or more elements are specified by a markup language of a webpage.

18. A computer program product according to claim 15, wherein the computer-executable program code portions further comprise program code instructions for:
    configuring a default search mode as an exhaustive search.

19. A computer program product according to claim 15, wherein the computer-executable program code portions further comprise program code instructions for configuring the packed Hilbert R-Tree to accept point queries.

20. A computer program product according to claim 15, wherein the specified points of each of the one or more elements is dependent on a shape of the element.

21. A computer program product according to claim 16, wherein the computer-executable program code portions further comprise program code instructions for:
    determining the specified points of the one or more elements, wherein, in an instance when an element is a rectangle, the specified points are the vertices of the rectangle, wherein in an instance when the element is a line, the specified points are resulting endpoints obtained by dividing the line into a plurality of segments, and wherein in an instance when the element is a circle, the specified points are obtained utilizing a center point and a radius of the circle.

* * * * *